(12) United States Patent
Hayashi (10) Patent No.: US 12,187,584 B2
(45) Date of Patent: Jan. 7, 2025

(54) IMAGE SYSTEM AND WORK VEHICLE PROVIDED WITH IMAGE SYSTEM

(71) Applicant: TADANO LTD., Kagawa (JP)

(72) Inventor: Hiroyuki Hayashi, Kagawa (JP)

(73) Assignee: TADANO LTD., Kagawa (JP)

( * ) Notice: Subject to any disclaimer, the term of this patent is extended or adjusted under 35 U.S.C. 154(b) by 371 days.

(21) Appl. No.: 17/615,756

(22) PCT Filed: Jun. 19, 2020

(86) PCT No.: PCT/JP2020/024136
§ 371 (c)(1),
(2) Date: Dec. 1, 2021

(87) PCT Pub. No.: WO2020/256101
PCT Pub. Date: Dec. 24, 2020

(65) Prior Publication Data
US 2022/0315391 A1    Oct. 6, 2022

(30) Foreign Application Priority Data

Jun. 20, 2019   (JP) .................................. 2019-114943

(51) Int. Cl.
*B66C 13/46* (2006.01)
*B66C 13/40* (2006.01)
(Continued)

(52) U.S. Cl.
CPC .............. *B66C 13/46* (2013.01); *B66C 23/88* (2013.01); *H04N 5/2621* (2013.01);
(Continued)

(58) Field of Classification Search
CPC ......... B66C 13/46; B66C 23/88; B66C 13/40; B66C 2700/0371; H04N 5/2621;
(Continued)

(56) References Cited

U.S. PATENT DOCUMENTS 10,661,712 B2    5/2020 Ishihara et al.
2013/0182066 A1  7/2013 Ishimoto
(Continued)

FOREIGN PATENT DOCUMENTS

JP    2011151742 A  *  8/2011
JP    2014-062803 A     4/2014
(Continued)

OTHER PUBLICATIONS

Sep. 8, 2020, International Search Report issued for related PCT application No. PCT/JP2020/024136.
(Continued)

*Primary Examiner* — Matthew C Bella
*Assistant Examiner* — Andrew B. Jones
(74) *Attorney, Agent, or Firm* — Paratus Law Group, PLLC (57) ABSTRACT

An image system is for a crane in which a boom that can be raised and lowered is provided to a vehicle with a rotating base therebetween, and said image system is provided with a plurality of vehicle body cameras provided to the vehicle, an upper camera provided to the boom, a display device, and an image processing device. The image processing device acquires vicinity images of the crane captured by the vehicle body cameras and an upper image of the crane captured by the upper camera, converts the vicinity images into images looking downward from an overhead virtual viewpoint, connects the results, generates a bird's-eye-view image, and uses the display device to display a composite image in which a supplementary image of the upper image corresponding to a missing part in the bird's-eye-view image is superimposed on the missing part.

9 Claims, 11 Drawing Sheets

(51) Int. Cl.
*B66C 23/88* (2006.01)
*H04N 5/262* (2006.01)
*H04N 5/265* (2006.01)
*H04N 5/272* (2006.01)

(52) U.S. Cl.
CPC ........... *H04N 5/2628* (2013.01); *H04N 5/265* (2013.01); *H04N 5/272* (2013.01); *B66C 13/40* (2013.01); *B66C 2700/0371* (2013.01)

(58) Field of Classification Search
CPC ...... H04N 5/2628; H04N 5/265; H04N 5/272; G06T 3/4038
See application file for complete search history.

(56) References Cited

U.S. PATENT DOCUMENTS

| 2018/0044893 | A1* | 2/2018 | Machida | G01S 13/04 |
| 2019/0322496 | A1 | 10/2019 | Hayashi | |
| 2019/0360177 | A1* | 11/2019 | Kiyota | E02F 9/26 |
| 2020/0354926 | A1* | 11/2020 | Ueda | E02F 9/2235 |
| 2022/0106168 | A1* | 4/2022 | Yamauchi | B66C 13/46 |

FOREIGN PATENT DOCUMENTS

| JP | 5462008 B2 | 4/2014 |
| JP | 2015-139158 A | 7/2015 |
| JP | 2018042205 A * | 3/2018 |
| JP | 2018-095449 A | 6/2018 |
| WO | WO 2018/047954 A1 | 3/2018 |

OTHER PUBLICATIONS

Sep. 8, 2020, International Search Opinion issued for related PCT application No. PCT/JP2020/024136.

Jul. 3, 2023, European Search Report issued for related EP Application No. 20826038.0.

* cited by examiner

IMAGE SYSTEM AND WORK VEHICLE PROVIDED WITH IMAGE SYSTEM

CROSS REFERENCE TO PRIOR APPLICATION

This application is a National Stage Patent Application of PCT International Patent Application No. PCT/JP2020/024136 (filed on Jun. 19, 2020) under 35 U.S.C. § 371, which claims priority to Japanese Patent Application No. 2019-114943 (filed on Jun. 20, 2019), which are all hereby incorporated by reference in their entirety.

TECHNICAL FIELD

The present invention relates to an image system and a work vehicle including the image system.

BACKGROUND ART

Conventionally, in a mobile crane that is a work vehicle including a rotating base and a boom, a field of view of an operator from an operator's seat is sometimes blocked by the boom or the like stored in a vehicle during traveling and a blind spot occurs. In addition, the operator's seat provided to the rotating base turns together with the rotating base during work and, thus, a position and a range of the blind spot from the operator's seat change. For this reason, there is a case where visual recognition from a driver's seat is not easy even if a position of a rearview mirror or the like is improved. In this regard, there is known a bird's-eye-view image system that generates a bird's-eye-view image of the vicinity of a work vehicle to project a range which is to be a blind spot from an operator's seat, thereby indirectly expanding a field of view from the operator's seat. An example thereof is disclosed in Patent Literature 1.

A bird's-eye-view image system described in Patent Literature 1 includes: a plurality of cameras that acquire vicinity images of a work vehicle in which a rotating base capable of turning is provided to a traveling body; a display unit that displays a bird's-eye-view image based on the images acquired by the respective cameras; and a control unit that converts the images acquired by the respective cameras into images looking downward from an overhead virtual viewpoint, connects the converted images to generate the bird's-eye-view image, and displays the bird's-eye-view image on the display unit. In the bird's-eye-view image system, the plurality of cameras are provided in each of the traveling body and the rotating base. The bird's-eye-view image system can obtain an appropriate bird's-eye-view image by switching cameras used in the time of traveling and the time of working.

The bird's-eye-view image system configured in this manner can obtain a field of view as if a camera is provided above, by generating the bird's-eye-view image looking downward from the overhead virtual viewpoint. In the bird's-eye-view image system, however, the near vicinity of the traveling body, a part of the traveling body, and the rotating base are not included in capturing ranges of the cameras because the bird's-eye-view image is generated by the cameras provided to the traveling body or the rotating base. That is, blind spots are generated in a Part of the traveling body, a turning body itself, and the near vicinity of a traveling vehicle in the bird's-eye-view image system, so that it is necessary for an operator to perform visual recognition with naked eyes.

CITATION LIST

Patent Literature

Patent Literature 1: JP 2018-95449A

SUMMARY OF THE INVENTION

Problems to be Solved by the Invention

An object of the present invention is to provide an image system that makes it possible to generate an image of a range extending over the entire circumference of a work vehicle and including the entire work vehicle and the near vicinity thereof from an image that is being actually captured, and a work vehicle provided with the image system.

Solutions to Problems

A problem to be solved by the present invention is as described above, and a means for solving the problem will be described below.

That is, the present invention includes: an image processing device that is connected to an image capturing device to be capable of communicating with each other, the image capturing device being provided in a traveling body of a work vehicle having a boom, and that generates a composite image, based on a plurality of vicinity images obtained by the image capturing device capturing a vicinity of the traveling body without discontinuity over the entire circumference and on an upper image obtained by the image capturing device capturing the traveling body and the vicinity of the traveling body from above; and a display device that displays the composite image. The image processing device converts the plurality of vicinity images into images looking downward from an overhead virtual viewpoint and connects the converted images to generate a bird's-eye-view image, and generates the composite image by superimposing a part of one of the bird's-eye-view image and the upper image, which corresponds to a missing part in the other of the bird's-eye-view image and the upper image, on the missing part.

Effects of the Invention

The present invention has the following effects.

In the present invention, the upper image of the work vehicle and the bird's-eye-view image of the vicinity of the work vehicle are combined, so that the missing part in the upper image or the bird's-eye-view image is compensated by the image that is being actually captured. As a result, it is possible to generate the image of the range extending over the entire circumference of the work vehicle and including the entire work vehicle and the near vicinity thereof from the image that is being actually captured.

BRIEF DESCRIPTION OF DRAWINGS

FIGS. 6A and 6B illustrate images captured by a vehicle body camera and an upper camera

FIGS. 8A and 8B illustrate a relationship between turning of a rotating base in the crane and a display mode of the bird's-eye-view image.

FIGS. 12A to 12C illustrate another embodiment of the superimposed image generation process.

DESCRIPTION OF EMBODIMENTS

Hereinafter, a crane 1, which is an embodiment of a work vehicle according to the present invention, will be described with reference to FIGS. 1 and 2. Note that a rough terrain crane will be described in the present embodiment, but any work vehicle having a boom, such as an all-terrain crane, a truck crane, a loading truck crane, and a high-place work vehicle, may be used.

Figure 1:
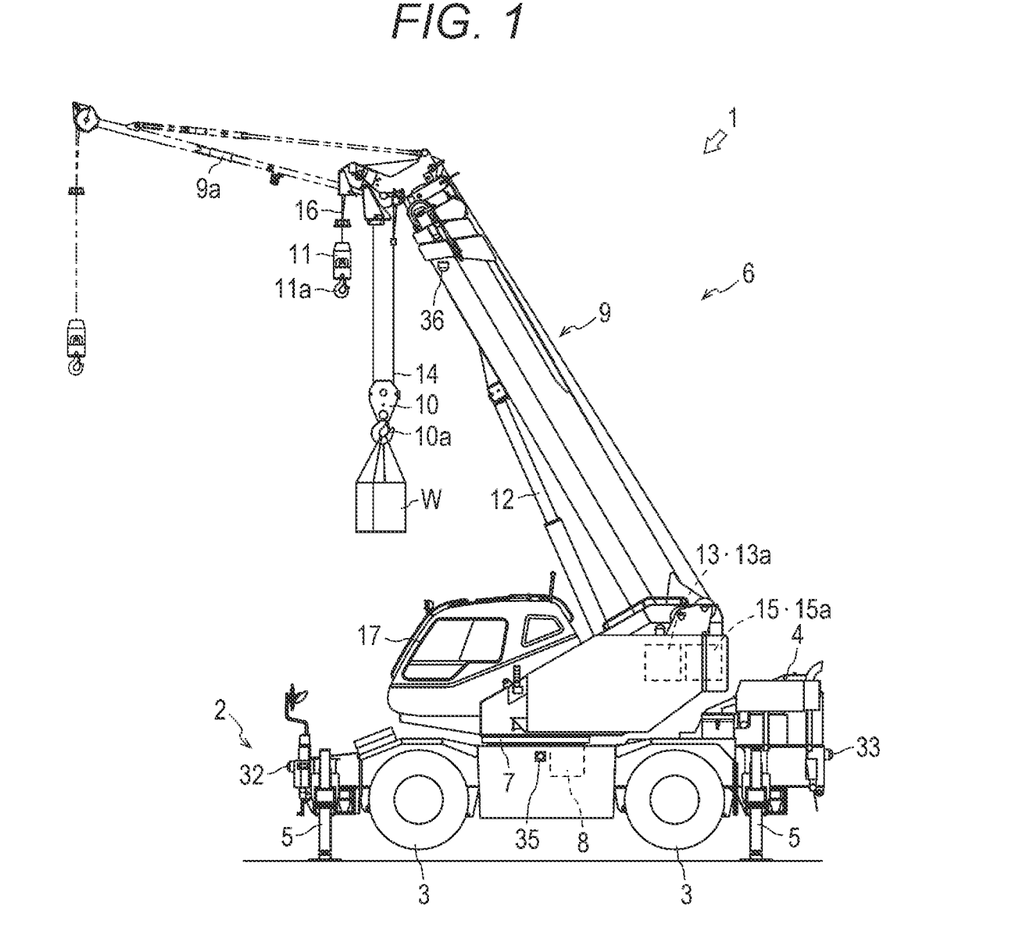
FIG. 1 is a side view illustrating an overall configuration of a crane.

As illustrated in FIG. 1, the crane 1 is the mobile crane that can move to an unspecified place. The crane 1 includes a remote operation terminal 39 (see FIG. 2) capable of remotely opera ting a vehicle 2 which is a traveling body, a crane device 6 which is a work device, a control device 30, and a crane device 6. In addition, the crane 1 includes an image system. 31 (see FIG. 2).

The vehicle 2 is a moving body that carries the crane device 6. The vehicle 2 has a plurality of wheels 3 and travels with an engine 4 as a power source. The vehicle 2 is provided with an outrigger 5. The vehicle 2 can expand an operable range of the crane 1 by extending the outrigger 5 in the width direction of the vehicle 2 and grounding the jack cylinder.

The crane device 6 is a device that lifts a load W with a wire rope. The crane device 6 includes a rotating base 7, a turning hydraulic motor 8, a boom 9, a main hook block 10, a sub hook block 11, a raising hydraulic cylinder 12, a main winch 13, a main hydraulic motor 13a, a main wire rope 14, a sub winch 15, a sub hydraulic motor 15a, a sub wire rope 16, a cabin 17, and the like.

The rotating base 7 is a device that turns the crane device 6. The rotating base 7 is configured to be rotatable about a center of the annular bearing as a center of rotation. The rotating base 7 is provided with a turning hydraulic motor 8 which is an actuator. The rotating base 7 is configured to be capable of turning in one direction and the other direction by the turning hydraulic motor 8.

The turning hydraulic motor 8 is rotationally operated by a turning valve 23 (see FIG. 2) which is an electromagnetic proportional switching valve. The turning valve 23 can control a flow rate of the hydraulic oil supplied to the turning hydraulic motor 8 to an arbitrary flow rate. The rotating base 7 is provided with a turning sensor 27 (see FIG. 2) that detects a turning angle 92, which is a turning angle of the rotating base 7, from a reference position.

The boom 9 is a beam member that supports the wire rope to a state of being capable of lifting the load W. The boom 9 is provided such that a proximal end of a base boom member is swingable substantially at the center of the rotating base 7. The boom 9 is configured to be freely elongated/contracted in the axial direction by moving each boom member by an elongation/contraction hydraulic cylinder (not illustrated) which is an actuator. In addition, the boom 9 is provided with a jib 9a.

A suspended load camera 9b (see FIG. 2) is an image capturing device that captures images of the load h and features in the vicinity of the load W. The suspended load camera 9b is provided at a distal end portion of the boom 9. The suspended load camera 9b is configured to be capable of capturing images of the load W and features or terrain in the vicinity of the crane 1 from vertically above the load W.

The elongation/contraction hydraulic cylinder is operated to be elongated/contracted by an elongation/contraction valve 24 (see FIG. 2) which is an electromagnetic proportional switching valve. The boom 9 is provided with an elongation/contraction sensor 28 that detects the length of the boom 9, a weight sensor that detects the weight of the load W, and the like.

The main hook block 10 and the sub hook block 11 are members for suspending the load W. The main hook block 10 is provided with a plurality of hook sheaves around which the main wire rope 14 is wound, and a main hook 10a for suspending the load W. The sub hook block 11 is provided with a sub hook 11a for suspending the load W.

The raising hydraulic cylinder 12 is an actuator that raises and lowers the boom 9 and holds an attitude of the boom 9. The raising hydraulic cylinder 12 is operated to be elongated/contracted by a raising valve 25 (see FIG. 2) which is an electromagnetic proportional switching valve. The boom 9 is provided with a raising sensor 29 (see FIG. 2) that detects a raising angle 91 of the boom 9.

The main winch 13 and the sub winch 15 wind up (reel up) and feed out (release) the main wire rope 14 and the sub wire rope 16. The main winch 13 is configured such that a main drum around which the main wire rope 14 is wound is rotated by a main hydraulic motor 13a, which is an actuator, and the sub winch 15 is configured such that a sub drum around which the sub wire rope 16 is wound is rotated by a sub hydraulic motor 15a which is an actuator.

The main hydraulic motor 13a is rotationally operated by a main valve 26m (see FIG. 2) which is an electromagnetic proportional switching valve. The main winch 13 is configured such that the main hydraulic motor 13a is controlled by the main valve 26m and can be operated at an arbitrary winding-up and feeding-out speed. Similarly, the sub winch 15 is configured such that the sub hydraulic motor 15a is controlled by a sub valve 26s (see FIG. 2), which is an electromagnetic proportional switching valve, and can be operated at an arbitrary winding-up and feeding-out speed.

The cabin. 17 is mounted on the rotating base 7. An operator's seat (not illustrated) is provided. The operator's seat is provided with an operation tool for operating the vehicle 2 to travel and a turning operation tool 18 for operating the crane device 6, a raising operation tool 19, an elongation contraction operation tool 20, a main drum operation tool 21m, a sub drum operation tool 21s, and the like.

Figure 2:
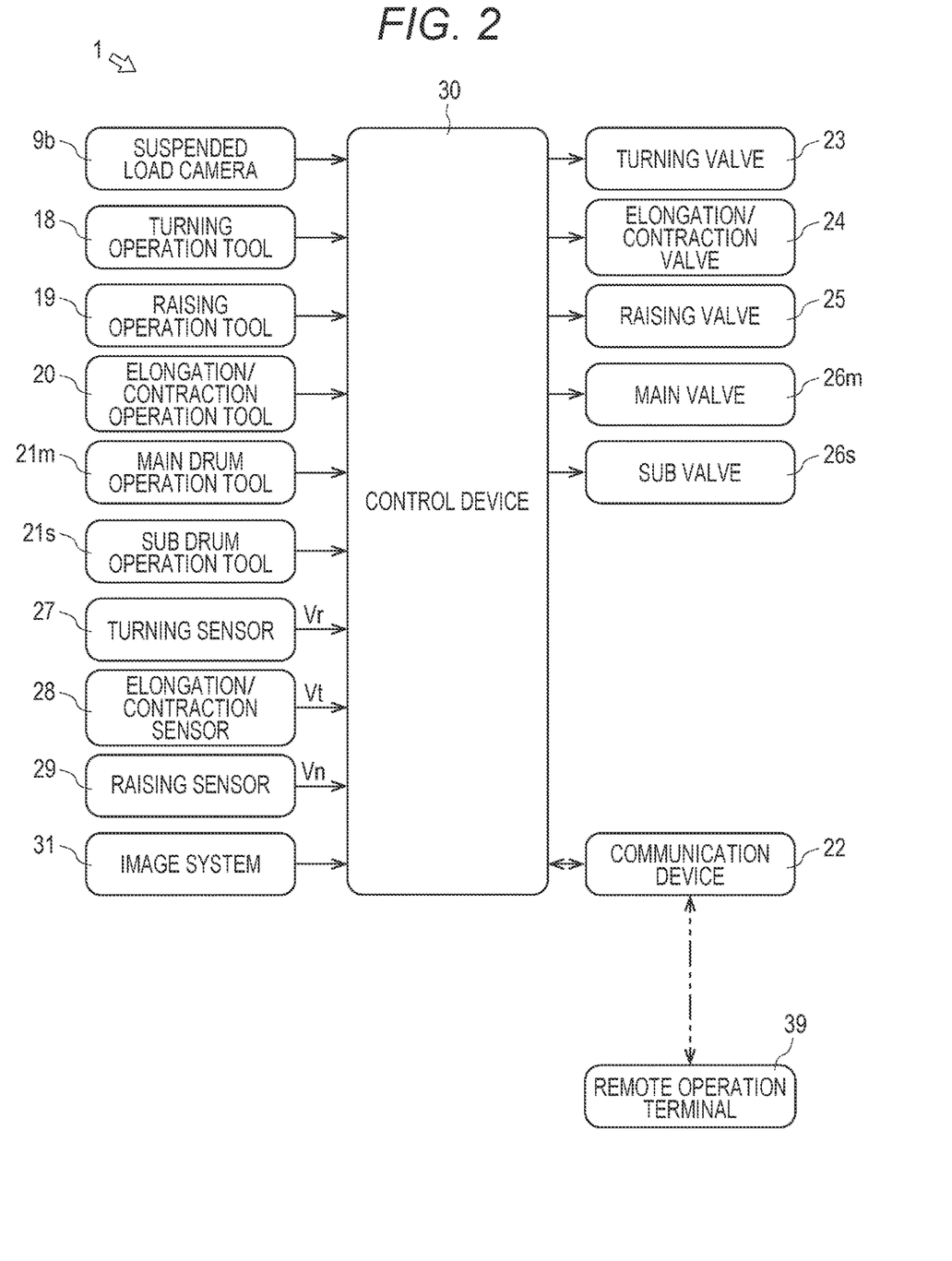
FIG. 2 is a block diagram illustrating a control configuration of the crane.

As illustrated in FIG. 2, a communication device 22 is a device that receives a control signal from the remote operation terminal 39 via a wide-area information communication network or the like, and transmits control information or the like from the crane device 6 via the wide-area information communication network or the like. The communication device 22 is provided in the cabin 17. The communication device 22 is configured to transfer the control signal or the like received from the remote operation terminal 39 to the control device 30 of the crane 1.

The control device 30 is a device that controls the actuators of the crane 1 via each operation valve. The control device 30 is provided in the cabin 17. In practice, the control device 30 may be configured such that a CPU, a RPM, a RAM, an HDD, and the like are connected via a bus, or may be configured using a one-chip LSI or the like. The control device 30 stores various programs and data in order to control the operations of the respective actuators, switching valves, sensors, and the like.

The control device 30 is connected to the suspended load camera 9b, the turning operation tool 18, the raising operation tool 19, the elongation/contraction operation tool 20, the main drum operation tool 21m, and the sub drum operation tool 21s, and can acquire a video of the suspended load camera 9b and acquire an operation amount of each of the turning operation tool 18, the raising operation tool 19, the main drum operation tool 21m, and the sub drum operation tool 21s.

The control device 30 is connected to the communication device 22, acquires the control signal from the remote operation terminal 39, and can transmit the control information from the crane device 6, the video from the suspended load camera 9b, and the like.

The control device 30 is connected to the turning valve 23, the elongation/contraction valve 24, the raising valve 25, the main valve 26m, and the sub valve 26s, and can transfer a control signal to the turning valve 23, the raising valve 25, the main valve 26m, and the sub valve 26s.

The control device 30 is connected to the turning sensor 27, the elongation/contraction sensor 28, and the raising sensor 29, and can acquire attitude information such as the turning angle θ2 of the rotating base 7, the boom length, and the raising angle θ1, and the weight of the load W.

The control device 30 can generate a control signal corresponding to each operation tool based on the operation amount of each of the turning operation tool 18, the raising operation tool 19, the elongation/contraction operation tool 20, the main drum operation tool 21m, and the sub drum operation tool 21s.

The image system 31 is a system that combines a vicinity image and an upper image of the crane 1 to Generate an image of a range extending over the entire circumference of the crane 1. The image system 31 is provided in the cabin 17 of the crane 1 and is connected to the control device 30.

The image system 31 is connected to the control device 30, and can acquire the turning angle θ2 of the rotating base 7 and the raising angle θ1 of the boom 9 from the control device 30. In addition, the image system 31 can acquire an operation signal for grounding the lack cylinder of the outrigger a from the control device 30.

The crane 1 configured in this manner can move the crane device 6 to an arbitrary position by causing the vehicle 2 to travel. In addition, the crane 1 can increase a lifting height and an operating radius of the crane device 6 by raising the boom 9 at an arbitrary raising angle θ1 by the raising hydraulic cylinder 12 with the operation of the raising operation tool 19 and extending the boom 9 to an arbitrary boom length with the operation of the elongation/contraction operation tool 20. In addition, the crane 1 can carry the load P by lifting the load. P with the operation of the sub drum operation tool 21s and the like and rotating the rotating base 7 by operating the turning operation tool 18.

Next, the image system 31 will be specifically described with reference to FIGS. 3 and 4. The image system 31 is a system that combines a bird's-eye-view image 21 in the vicinity of the crane 1 and a supplementary image 22 extracted from an upper image to generate a composite image 23 in a range extending over the entire circumference of the crane 1 including the crane 1. The image in the range extending over the entire circumference of the crane 1 is an image including the vehicle 2 of the crane 1 and the ground (traveling surface) and features surrounding the vehicle 2 when viewed from the upper side (above) in the vertical direction of the crane 1, and is an image including the ground and features in a region from a position adjacent to the vehicle 2 to a position at a predetermined distance around the vehicle 2 (see FIGS. 6A and GB).

Figure 3:
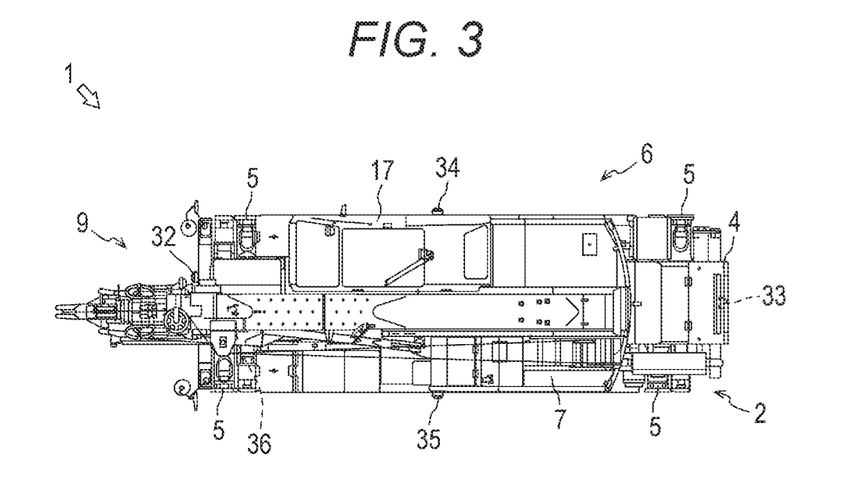
FIG. 3 is a plan view illustrating a schematic configuration of the crane.
Figure 4:
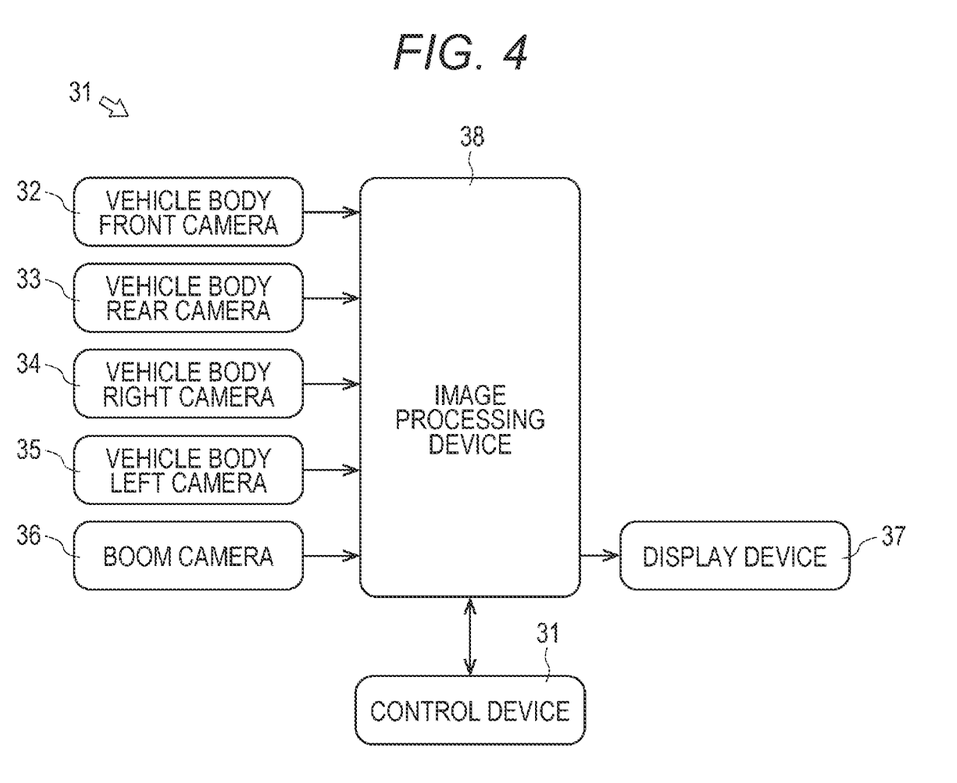
FIG. 4 is a block diagram illustrating a configuration of an image system.

As illustrated in FIGS. 3 and 4, the image system. 31 includes a vehicle body front camera 32, a vehicle body rear camera 33, a vehicle body right camera 34, and a vehicle body left camera 35, which are vehicle body cameras provided in the vehicle 2, an upper camera 36 provided in the boom 9, a display device 37, and an image processing device 38. Note that the vehicle body front camera 32, the vehicle body rear camera 33, the vehicle body right camera 34, the vehicle body left camera 35, and the upper camera 36 correspond to the "image capturing device" of the present invention, and are connected to the image processing device 38 to be capable of communicating with each other.

The vehicle body front camera 32, the vehicle body rear camera 33, the vehicle body right camera 34, and the vehicle body left camera 35 are configured using wide-angle cameras each of which has an angle of view of approximately 180 degrees, for example. The vehicle body front camera 32 is provided at a front end portion which is an end portion on a side in the forward direction of the vehicle 2. The vehicle body front camera 32 captures an image of the front of the vehicle 2. The vehicle body rear camera 33 is provided at a rear end portion which is an end portion on a side in the reverse direction of the vehicle 2. The vehicle body rear camera 33 captures an image of the rear of the vehicle 2. The vehicle body right camera 34 is provided on a right side surface in the traveling direction of the vehicle 2. The vehicle body right camera 34 captures an image of the right of the vehicle 2. The vehicle body left camera 35 is provided on a left side surface in the traveling direction of the vehicle 2. The vehicle body left camera 35 captures an image of the left of the vehicle 2. Note that each of the vehicle body cameras may be provided at a position where an image of the vicinity of the vehicle 2 can be acquired without discontinuity over the entire circumference.

The upper camera 36 is configured using, for example, a wide-angle camera which has an angle of view of approximately 180 degrees. The upper camera 36 is provided at a distal end portion of a base boom member swingably supported by the rotating base 7 in the boom 9 (see FIG. 1) The upper camera 36 acquires an upper image of the crane 1, which is an image including the vehicle 2 and the vicinity of the vehicle 2 captured from above the vehicle 2, in a raised state of the boom 9. Note that the upper camera 36 is provided to the base boom member in the present embodiment, but may be provided in a part where the upper image of the crane 1, which is the image including the vehicle 2 and the vicinity of the vehicle 2 captured from above the vehicle 2, can be acquired.

The display device 37 is a device that displays the images of the vehicle body cameras and the upper camera 36. The display device 37 is disposed inside the cabin 17. Note that the display device 37 may be provided in the remote operation terminal 39 that remotely operates the crane 1 outside the cabin 17.

The image processing device 38 is a processing device that converts and combines vicinity images of the crane 1 captured by the respective vehicle body cameras and the upper image of the crane 1 captured by the upper camera 36. The image processing device 38 is provided inside the cabin 17. In practice, the image processing device 38 may be configured such that a CPU, a RUM, a RAM, an HDD, and the like are connected via a bus, or may be configured using a one-chip LSI or the like. The image processing device 38 stores various programs and data configured to control the respective vehicle body cameras, the upper camera 36, and the respective sensors, acquire images and signals from the sensors, and perform image processing.

The image processing device 38 is connected to the vehicle body front camera 32, the vehicle body rear camera 33, the vehicle body right camera 34, the vehicle body left camera 35, and the upper camera 36, and can acquire the vicinity images of the crane 1 captured by the vehicle body front camera 32, the vehicle body rear camera 33, the vehicle body right camera 34, and the vehicle body left camera 35 and the upper image of the crane 1 captured by the upper camera 36. In addition, the image processing device 38 is connected to the display device 37, and can transmit generated images to the display device 37.

The image processing device 38 performs control of a process of generating the bird's-eye-view image P1 (image data thereof) based on signals from the respective vehicle body cameras, the supplementary image P2 (image data thereof) based on a signal from the upper camera 36, and the composite image P3 (image data thereof) of the bird's-eye-view image P1 and the supplementary image P2, a display process of displaying the composite image P3 on the display device 37, an acquisition process of acquiring various types of acquired information, and the like.

Figure 10:
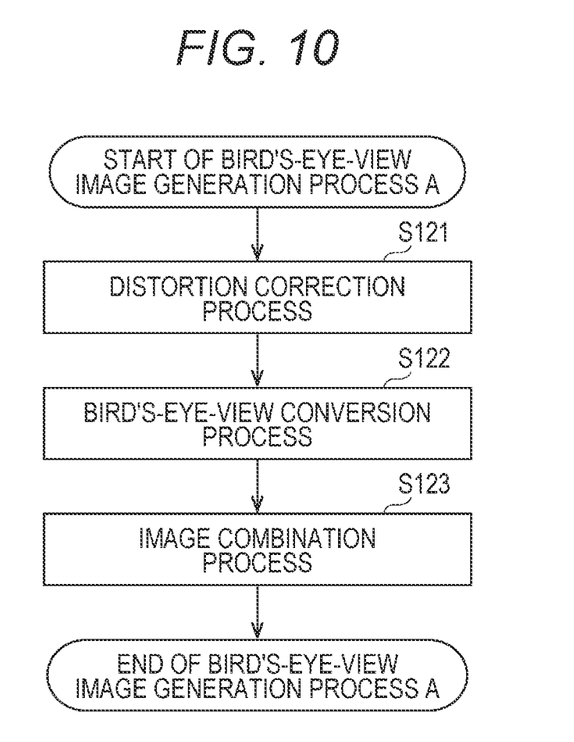
FIG. 10 is a flowchart illustrating a bird's-eye-view image generation process in the image system.

The image processing device 38 can perform a bird's-eye-view image generation process of generating the bird's-eye-view image P1 from the vicinity images of the crane 1 captured by the vehicle body front camera 32, the vehicle body rear camera 33, the vehicle body right camera 34, and the vehicle body left camera 35 every unit time (see FIG. 10). The bird's-eye-view image generation process includes, for example, a distortion correct iron process (step S121), a bird's-eye view conversion process (step S122), and an image combination process (step S123). Note that the image processing device 38 may perform these processes simultaneously or perform processes of other contents as long as the bird's-eye-view image P1 is generated, As the distortion correction process, the image processing device 38 multiplies a coordinate value of an input pixel of an image captured by each of the vehicle body cameras by a coefficient based on a lens distortion coefficient, an aspect ratio, or the like to convert the coordinate value into a coordinate value of an output pixel, thereby correcting distortion due to a lens.

As the bird's-eye view conversion process, the image processing device 38 multiplies coordinate values of appropriately selected input pixels by various coefficients based on a camera attachment angle or the like to form all of coordinate values of output pixels, thereby converting the image into a captured image (individual bird's-eye-view image) looking downward from a virtual viewpoint set above the crane 1.

As the image combination process, the image processing device 38 connects adjacent individual bird's-eye-view images from the respective vehicle body cameras, which have been subjected to the above-described processes, as one image while eliminating a sense of incompatibility at a joint by performing linear interpolation or the like on the brightness of the corresponding coordinate value, thereby generating the bird's-eye-view image P1.

The image processing device 38 can perform a superimposed image generation process of generating the supplementary image P2 that is an image of a part, which corresponds to a missing part in the bird's-eye-view image P1, in the upper image of the crane 1 captured by the upper camera 36, and generating the composite image P3 in which the supplementary image P2 is superimposed on the missing part in the bird's-eye-view image P1 every unit time (see FIG. 11), The superimposed image generation process includes, for example, a region extraction process (step S152), a matching process (step S153), and a superimposition process (step S154). Note that the image processing device 38 may perform these processes simultaneously or perform processes of other contents as long as the composite image P3 is generated, Note that the missing part in the bird's-eye-view image P1 is a part corresponding to images of the vehicle 2 and the rotating base 7 of the crane 1 that are not included in the field of view of each of the vehicle body cameras.

Figure 11:
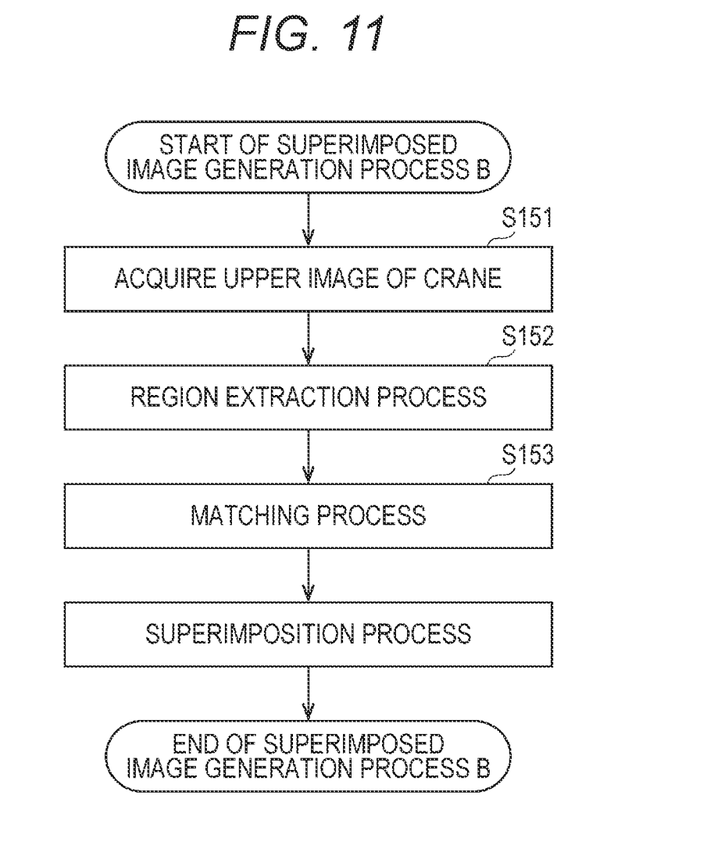
FIG. 11 is a flowchart illustrating a superimposed image generation process in the image system.

As the region extraction process, the image processing device extracts a closed region by a known method, such as binarization, from the upper image of the crane 1 captured by the upper camera 36.

As the matching process, the image processing device 36 slides a reference image on the upper image using an image of the vehicle 2 registered in advance as the reference image, and compares the region extracted from the upper image with the reference image. The image processing device 38 specifies a region having high similarity with the reference image as the supplementary image P2 corresponding to the vehicle 2.

As the superimposition process, the image processing device 38 cuts out the specified supplementary image P2, and corrects distortion by multiplying the specified supplementary image P2 by a coefficient based on a lens distortion coefficient, an aspect ratio, or the like so as to conform to the missing part in the bird's-eye-view image P1. Further, the image processing device 38 generates the composite image P3 in a state in which the corrected supplementary image P2 is superimposed on the bird's-eye-view image P1.

The image system 31 configured in this manner can generate the bird's-eye-view image P1 every unit time from the vicinity images of the crane 1 captured by the vehicle body front camera 32, the vehicle body rear camera 33, the vehicle body right camera 34, and the vehicle body left camera 35 which are the vehicle body cameras. In addition, the image system 31 can generate the supplementary image P2, which is the image of the part corresponding to the missing part in the bird's-eye-view image P1, every unit time from the upper image of the crane 1 captured by the upper camera 36. Further, the image system 31 can form the composite image P3 in which the supplementary image P2 is superimposed on the missing part in the bird's-eye-view image P1 generated from the image of the vicinity of a vehicle body 2 every unit time.

Next, control of the image system 31 in a travel mode in which the crane 1 can travel and in a work mode of the crane device 6 will be described with reference to FIGS. 5 to 8. In the present embodiment, the time of traveling of the crane 1 refers to a state in which the use of the boom 9 is not practical and is lowered up to a reference angle α or less at which it is difficult to sufficiently secure the Field of view of the upper camera 36. In addition, the work mode of the crane 1 refers to a state in which the boom 9 is raised exceeding the reference angle α.

When the crane 1 is activated, the image processing device 38 of the image system 31 starts capturing the surroundings of the crane 1 by the vehicle body front camera 32, the vehicle body rear camera 33, the vehicle body right camera 34, and the vehicle body left camera 35.

Figure 5:
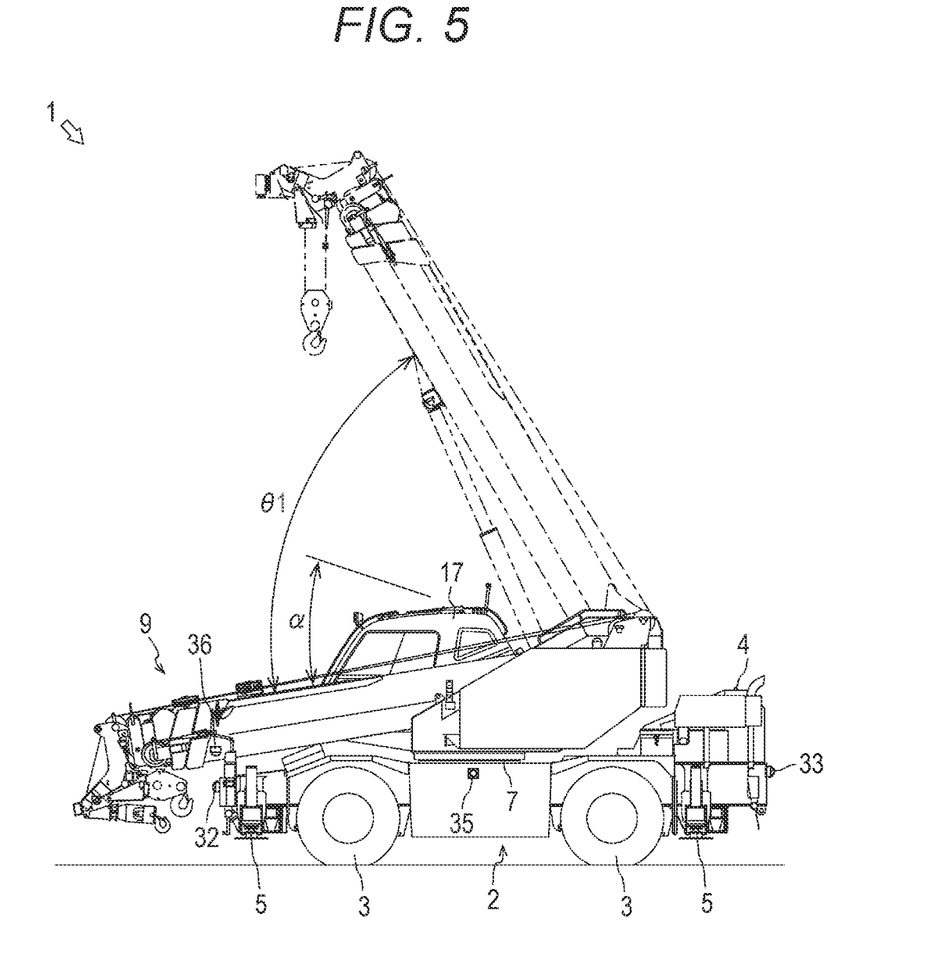
FIG. 5 is a schematic view illustrating raising and lowering of a boom in a travel mode and a work mode of the crane.

As illustrated in FIG. 5, the image processing device 38 acquires the raising angle θ1 of the boom 9 from the control device 30 of the crane 1. When the raising angle θ1 of the boom 9 is equal to or smaller than the reference angle α, the image processing device 38 determines that the crane 1 is in the travel mode. On the other hand, when the raising angle θ1 of the boom 9 acquired from the control device 30 of the crane 1 is larger than the reference angle α, the image processing device 38 determines that the crane 1 is in the work mode.

Figure 6A:
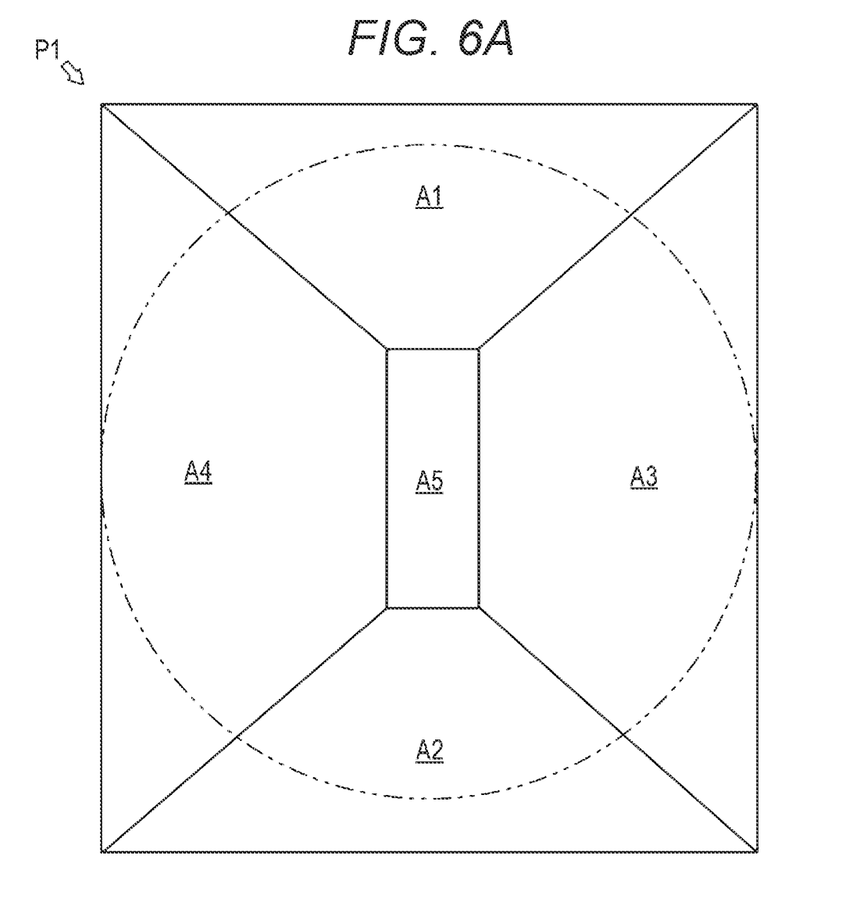
FIG. 6A illustrates a bird's-eye-view image generated from a vicinity image captured by the vehicle body camera.
Figure 12A:
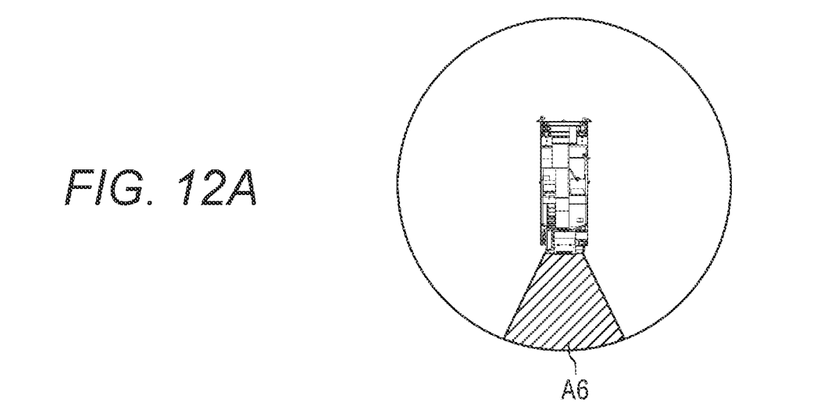
FIG. 12A illustrates a missing part in an upper image of a crane.
Figure 12B:
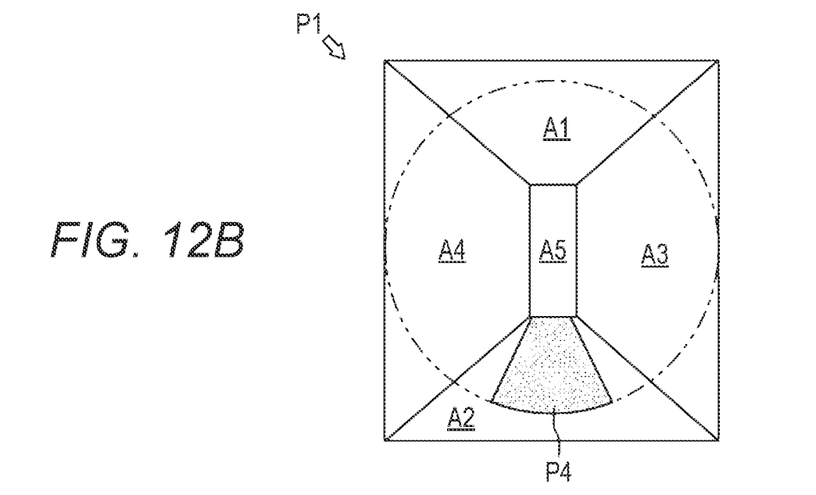
FIG. 12B illustrates a supplementary image corresponding to the missing part in a bird's-eye-view image.
Figure 12C:
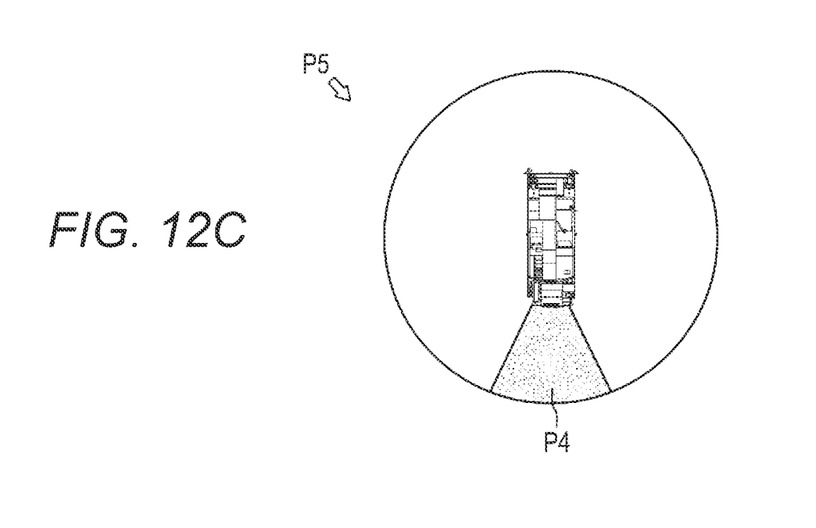
FIG. 12C illustrates a composite image in which the supplementary image is superimposed on the missing part in the upper image.

As illustrated in FIG. 6k, the image processing device 38 performs the bird's-eye-view image generation process and generates the bird's-eye-view image P1 from the vicinity images of the crane 1 captured by the respective vehicle body cameras every unit time. The image processing device 38 generates a front captured image (hereinafter, simply referred to as a "bird's-eye-view image") A1 looking downward from a virtual viewpoint set above the crane 1 from the image captured by the vehicle body front camera 32. Similarly, the image processing device 38 generates a rear bird's-eye-view image 42 from the image captured by the vehicle body rear camera 33, generates a right bird's-eye-view image A3 from the image captured by the vehicle body right camera 34, and Generates a left bird's-eye-view image A4 from the image captured by the vehicle body left camera 35. The image processing device 38 connects the front bird's-eye-view image A1, the rear bird's-eye-view image A2, the right bird's-eye-view image A3, and the left bird's-eye-view image A4 as one bird's-eye-view image to generate the bird's-eye-view image 81. At this time, a part of the crane 1 corresponding to the vehicle 2 is generated as a missing part A5 that is not capturable by the vehicle body camera Note that a range surrounded by a circular ring in FIGS. 7, 8, and 12 is a range displayed on the display device 37.

Figure 6B:
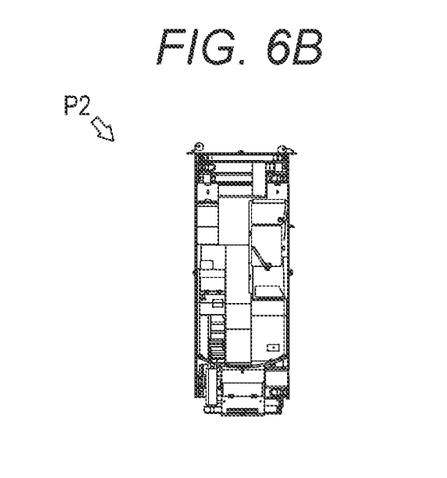
FIG. 6B illustrates a supplementary image generated from an upper image captured by the upper camera.

As illustrated in FIG. 6B, when determining that the crane 1 is in the work mode, the image processing device 38 performs the superimposed image generation process and generates the supplementary image P2 that is a part, which corresponds to the missing part A5 of the bird's-eye-view image 81, in the upper image of the crane 1 captured by the upper camera 36.

Figure 7:
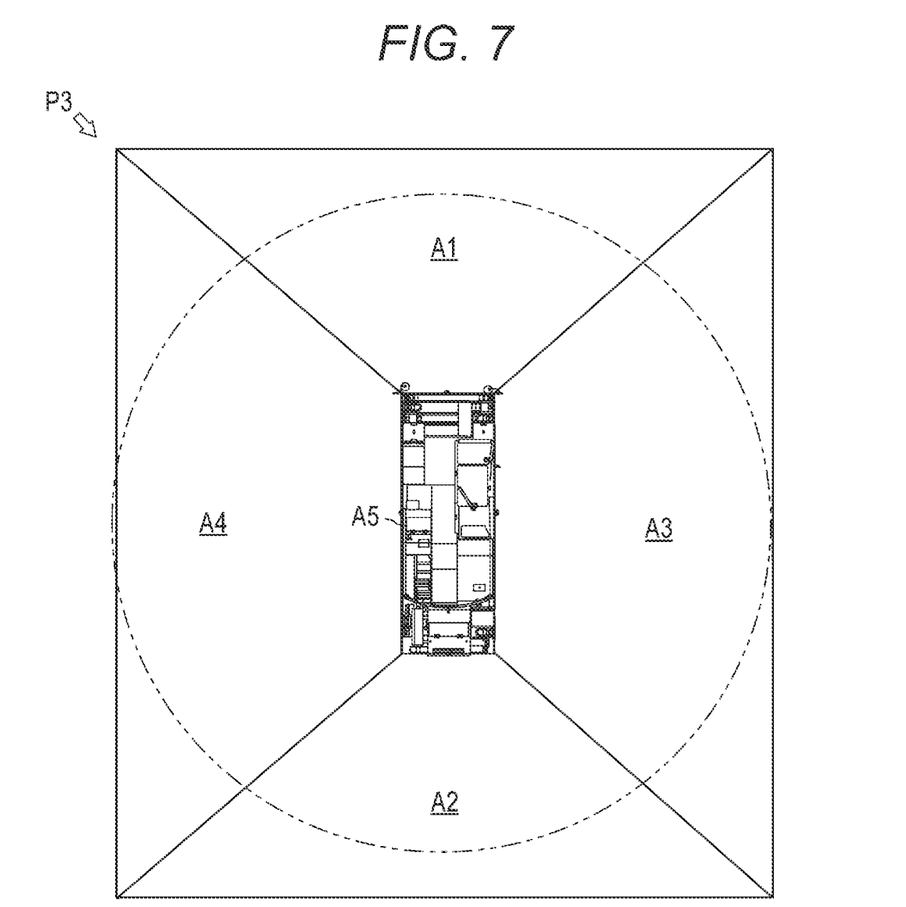
FIG. 7 is a view illustrating a composite image in which the bird's-eye-view image and the supplementary image are superimposed on each other.

As illustrated in FIG. 7, the image processing device 38 performs the superimposed image generation process and superimposes the supplementary image P2 on the missing part A5 of the bird's-eye-view image 81 to generate the composite image P3 based on the bird's-eye-view image P1 every unit time.

Figure 8A:
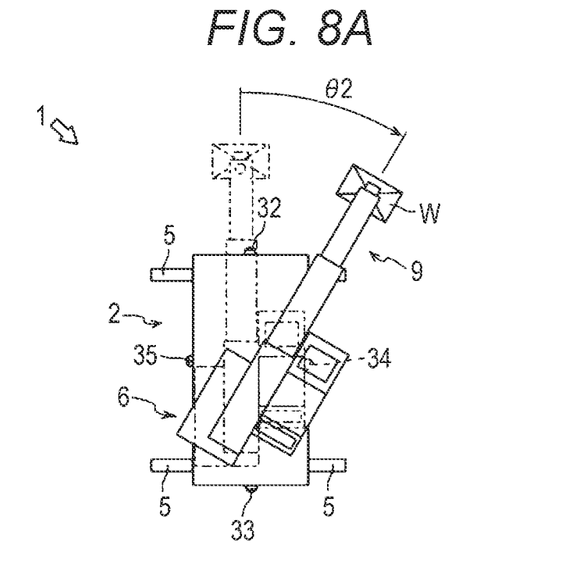
FIG. 8A illustrates a turning state of the rotating base of the crane.
Figure 8B:
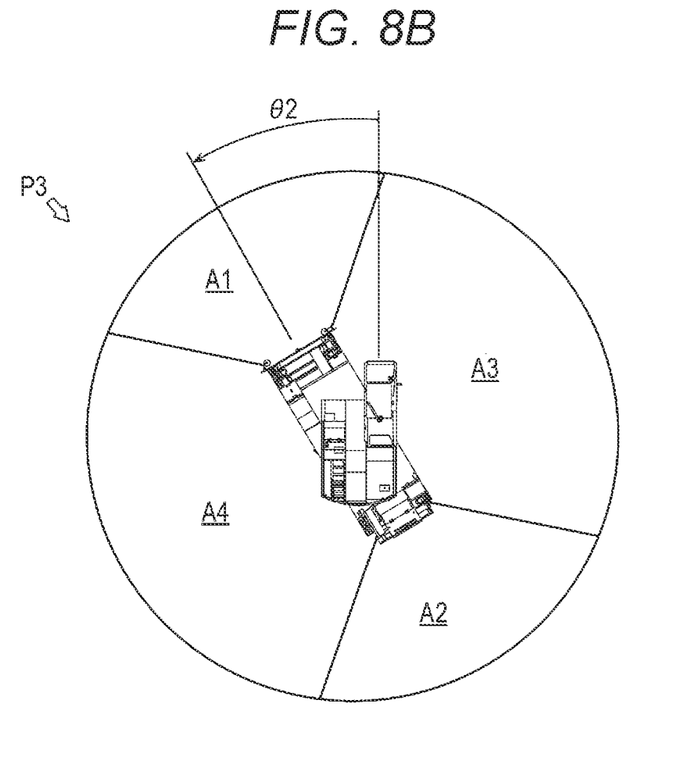
FIG. 8B illustrates the composite image rotated and displayed.

In addition, the image processing device 38 acquires the turning angle 92 of the rotating base 7 from the control device 30 of the crane 1 as illustrated in FIG. 8A. When the rotating base 7 turns clockwise by an angle θ2 from the reference position, the image processing device 38 acquires the turning angle θ2.

As illustrated in FIG. 8B, the image processing device 38 rotates the composite image P3 counterclockwise by the angle θ2 and displays the rotated composite image P3 on the display device 37. That is, when the rotating base 7 has turned in one direction by an arbitrary angle, the image processing device 38 causes the composite image P3 in which the missing part in the bird's-eye-view image P1 is compensated by the supplementary image P2 to be rotated in the other direction by the angle at which the rotating base 7 has turned and displayed. With such control, the image system 31 displays the composite image P3 on the display device 37 in conjunction with the turning of the rotating base 7 using the rotating base 7 as the reference. As a result, the range extending over the entire circumference of the crane 1 including the entire crane 1 and the near vicinity of the crane 1 is displayed using the operator's seat as the reference, and thus, an operator can easily grasp a positional relationship between the vicinity of the crane 1 and the boom 9.

Hereinafter, image processing control for generating the bird's-eye-view image P1, the supplementary image P2, and the composite image P3 by the image system 31 will be specifically described with reference to FIGS. 9 to 11. In the following embodiment, the crane 1 is operated by the operation tools provided in the cabin 17, but may be controlled by the remote operation terminal 39.

Figure 9:
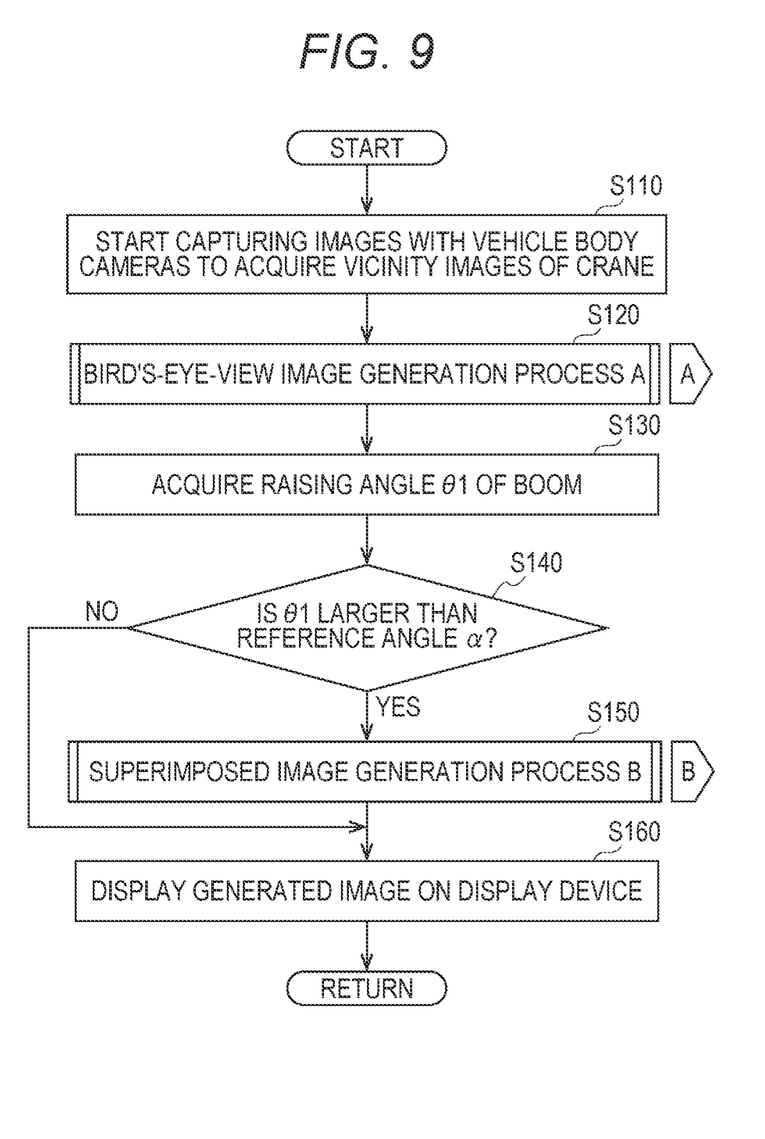
FIG. 9 is a flowchart illustrating a mode of image processing control in the image system.

As illustrated in FIG. 9, the image processing device 38 starts capturing by the vehicle body front camera 32, the vehicle body rear camera 33, the vehicle body right camera 34, and the vehicle body left camera 35 and acquires the vicinity images of the crane 1 in step S110 of the image processing control, and the step is shifted to step S120.

In step S120, the image processing device 38 starts a bird's-eye-view image generation process A, and the step is shifted to step S121 (see FIG. 10).

As illustrated in FIG. 10, the image processing device 38 corrects distortion due to the lens in the acquired images as the distortion correction process in step S121 in the bird's-eye-view image generation process A, and the step is shifted to step S122.

In step S122, the image processing device 38 converts the acquired vicinity images of the crane 1 into the front bird's-eye-view image A1, the rear bird's-eye-view image A2, the right bird's-eye-view image A3, and the left bird's-eye-view image A4 as the bird's-eye view conversion process, and the step is shifted to step S123.

In step S123, the image processing device 38 connects adjacent individual bird's-eye-view images captured from the vehicle body cameras, which have been subjected to the respective processes, as one image to generate the bird's-eye-view image 31 as the image combination process, and ends the bird's-eye-view image generation process A, and the step is shifted to step S130 (see FIG. 9).

As illustrated in FIG. 9, in step S130, the image processing device 38 acquires the raising angle θ1 of the boom 9 from the control device 30 of the crane 1, and the step is shifted to step S140.

In step S140, the image processing device 38 determines whether the acquired raising angle θ1 of the boom 9 is larger than the reference angle α. As a result, when the raising angle θ1 of the boom 9 is larger than the reference angle α, that is, when the crane 1 is in the work mode, the image processing device 36 shifts the step to step S150. On the other hand, when the raising angle θ1 of the boom 9 is equal to or smaller than the reference angle α, that is, when the crane 1 is in the travel mode, the image processing device 38 shifts the step to step S160.

In step S150, the image processing device 38 starts a superimposed image generation process 13, and the step is shifted to step S151 (see FIG. 11).

As illustrated in FIG. 11, the image processing device 38 starts capturing by the upper camera 36 and acquires the upper image of the crane 1 in step S151 in the superimposed image generation process B, and the step is shifted to step S152.

In step S152, the image processing device 38 extracts a closed region from the upper image of the crane 1 by a known method such as binarization as the region extraction process, and the step is shifted to step S153.

In step S153, the image processing device 38 compares the region extracted from the upper image of the crane 1 with the reference image, specifies a region having high similarity as the supplementary image P2 corresponding to the vehicle 2 as the matching process, and the step is shifted to step 154.

In step S154, the image processing device 38 cuts out and corrects the supplementary image P2 to conform to a missing part in the bird's-eye-view image P1 and superimposes the supplementary image P2 on the bird's-eye-view image P1 to generate the composite image P3 based on the bird's-eye-view image P1 as the super imposition process, and ends the superimposed image generation process B, and the step is shifted to step S160 (see FIG. 9).

As illustrated in FIG. 9, the image processing device 38 displays the generated image on the display device 37 in step S160, and the step is shifted to step S110.

With this configuration, the image processing device 38 of the image system 31 determines whether the crane 1 is in the travel mode or the work mode based on the raising angle θ1 of the boom 9. For this reason, the image system 31 constantly captures the upper image of the crane 1 as long as the upper camera 36 can capture the upper image of the crane 1. That is, in an image processing system, the range extending over the entire circumference of the crane 1 is captured by a camera suitable for capturing in accordance with a state of the crane 1. The image system 31 generates the bird's-eye-view image P1 in the travel mode, and generates the composite image P3 based on the bird's-eye-view image P1 in the work mode. Since the composite image P3 is obtained by superimposing the supplementary image P2 of the vehicle 2 captured by the upper camera 36, a part that is not capturable by the vehicle body camera is supplemented. Therefore, the composite image P3 of the image system is displayed in real time even when a worker or the like mores up on the vehicle 2 during work. As a result, it as possible to generate an image of the range extending over the entire circumference of the crane 1 including the crane 1 and the near vicinity of the crane 1 from an image that is being actually captured.

Note that the supplementary image P2 is superimposed on the missing part in the bird's-eye-view image P1 generated based on the vicinity image of the crane 1 captured by the vehicle body camera in the composite image 93 in the present embodiment. However, a corresponding part of the bird's-eye-view image 91 may be superimposed and displayed on a missing part in the upper image of the crane 1 captured by the upper camera 36.

As illustrated in FIG. 12A, the boom 9 enters the field of view of the upper camera 36 depending on the raising angle θ1 of the boom 9, and a missing part A6 in which a capturing region is blocked is generated in the upper image of the crane 1. Therefore, the missing part A6, blocked by the boom 9 according to the raising angle θ1 of the boom 9, in the capturing region of the upper camera 36 is registered for each raising angle θ1 of the boom. 9 in the image processing device 38 of the image system 31.

As illustrated in FIG. 12B, the image processing device 38 specifies a region having a shape corresponding to the missing part A6 in the upper image from the raising angle θ1 of the boom 9. Further, the image processing device 38 specifies a position corresponding to the missing part A6 in the upper image from the turning angle θ2 of the rotating base 7 in the bird's-eye-view image P1. Then, the image processing device 38 cuts out the specified position in the region having the specified shape from the bird's-eye-view image P1 and generates the cut-out as a supplementary image P4.

As illustrated in FIG. 12C, the image processing device 38 generates a composite image P5 in which the supplementary image P4 is superimposed on the upper image of the crane 1, That is, the image processing device 38 generates the composite image P5 based on the upper image of the crane 1. With this configuration, the missing part in the upper image is compensated by the image that is being actually captured by the composition of the supplementary image P4 and the bird's-eye-view image P1 in the image system 31. As a result, it is possible to generate an image of the range extending over the entire circumference of the crane 1 including the entire crane 1 and the near vicinity of the crane 1 from the image that is being actually captured.

Note that the vehicle body cameras are provided at the front end portion, the rear end portion, and the left and right side surfaces of the vehicle 2 in the crane 1 in the present embodiment, but may be provided at a front end portion, a rear end portion, and left and right side surfaces of the rotating base 7. In addition, the image processing device 38 of the image system 31 determines the travel mode or the work mode of the crane 1 based on the raising angle θ1 of the boom 9, but may determine the travel mode or the work mode of the crane 1 based on a state that always occurs only in the work mode, such as an operating state of the outrigger 5 and the turning angle θ2 of the rotating base 7, or a control signal.

The above-described embodiment merely illustrates a typical form, and various modifications can be implemented within a scope not departing from a gist of the embodiment. Needless to say, the present invention can be implemented in various forms, and the scope of the present invention encompasses those illustrated in the description of the claims, those having meanings equivalent to those in the claims, and all alterations within the scope.

REFERENCE SIGNS LIST 1 crane
6 crane device
9 boom
30 control device
31 image system
32 vehicle body front camera
33 vehicle body rear camera
34 vehicle body right camera
35 vehicle body left camera
36 upper camera 37 display device
P1 bird's-eye-view image
P2 supplementary image
P3 composite image

The invention claimed is:

1. An image system of a crane comprising:
an image processing device that is connected to a plurality of vehicle body cameras and an upper camera to be capable of communicating with each other, the plurality of vehicle body cameras being provided on a traveling body of the crane, the upper camera being provided on a boom of the crane, and that generates a composite image, based on a plurality of vicinity images obtained in real time by the plurality of vehicle body cameras capturing a vicinity of the traveling body without discontinuity over an entire circumference and on an upper image obtained in real time by the upper camera capturing the traveling body and the vicinity of the traveling body from above; and
a display device that displays the composite image, wherein
the image processing device
converts the plurality of vicinity images into images looking downward from an overhead virtual viewpoint and connects the converted images to generate a bird's-eye-view image,
extracts a closed region of the traveling body from the upper image, and
superimposes the closed region of the traveling body extracted from the upper image on a missing part in the bird's-eye-view image to generate the composite image in which the missing part has been supplemented, and
wherein the image processing device, when the crane is in a travel mode, causes the display device to display the bird's-eye-view image without superimposing the image of the traveling body extracted from the upper image, and when the crane is in a work mode, causes the display device to display the composite image with superimposing the image of the traveling body extracted from the upper image.

2. The image system of the crane according to claim 1, wherein
the image processing device superimposes a part of the upper image, which corresponds to a missing part in the bird's-eye-view image, on the missing part.

3. The image system of the crane according to claim 1, wherein
the image processing device superimposes a part of the bird's-eye-view image, which corresponds to a missing part in the upper image, on the missing part.

4. The image system of the crane according to claim 1, wherein
the traveling body is provided with the boom with a rotating base interposed between the traveling body and the boom, and
when the rotating base has turned in one direction, the image processing device rotates the composite image being displayed on the display device in another direction by an angle at which the rotating base has turned.

5. The image system of the crane according to claim 1, wherein
the boom is raisable and lowerable, and
the image processing device determines whether the crane is in the travel mode or in the work mode, based on the raising angle of the boom.

6. The image system of the crane according to claim 4, wherein
the image processing device is provided in a cabin mounted on the rotating base.

7. The image system of the crane according to claim 4, wherein
the display device is disposed inside a cabin mounted on the rotating base.

8. The image system of the crane according to claim 4, wherein
the display device is provided in a remote operation terminal that remotely operates the crane outside a cabin mounted on the rotating base.

9. A work vehicle comprising the image system of the crane according to claim 1.

* * * * *